Patented July 30, 1940

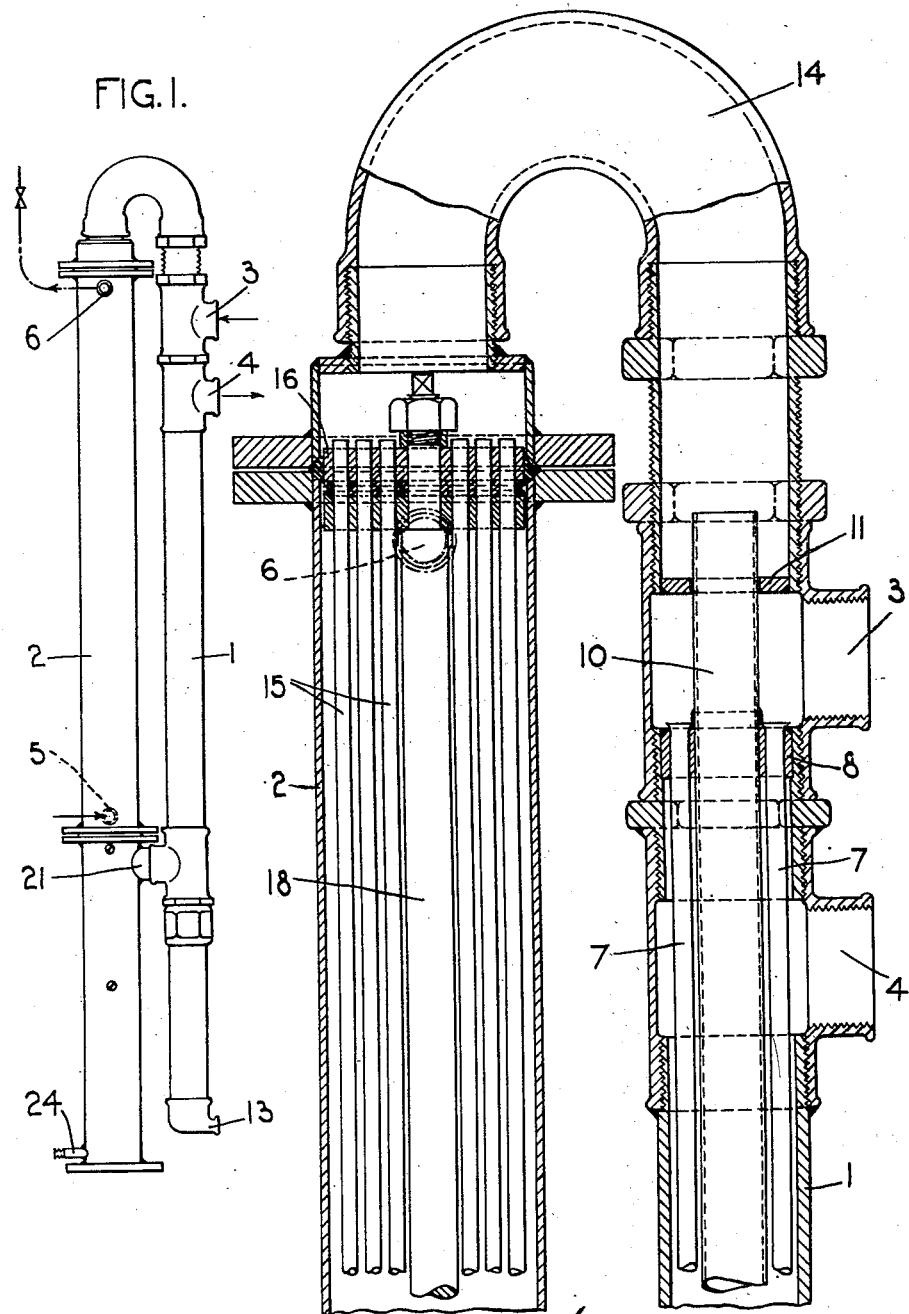

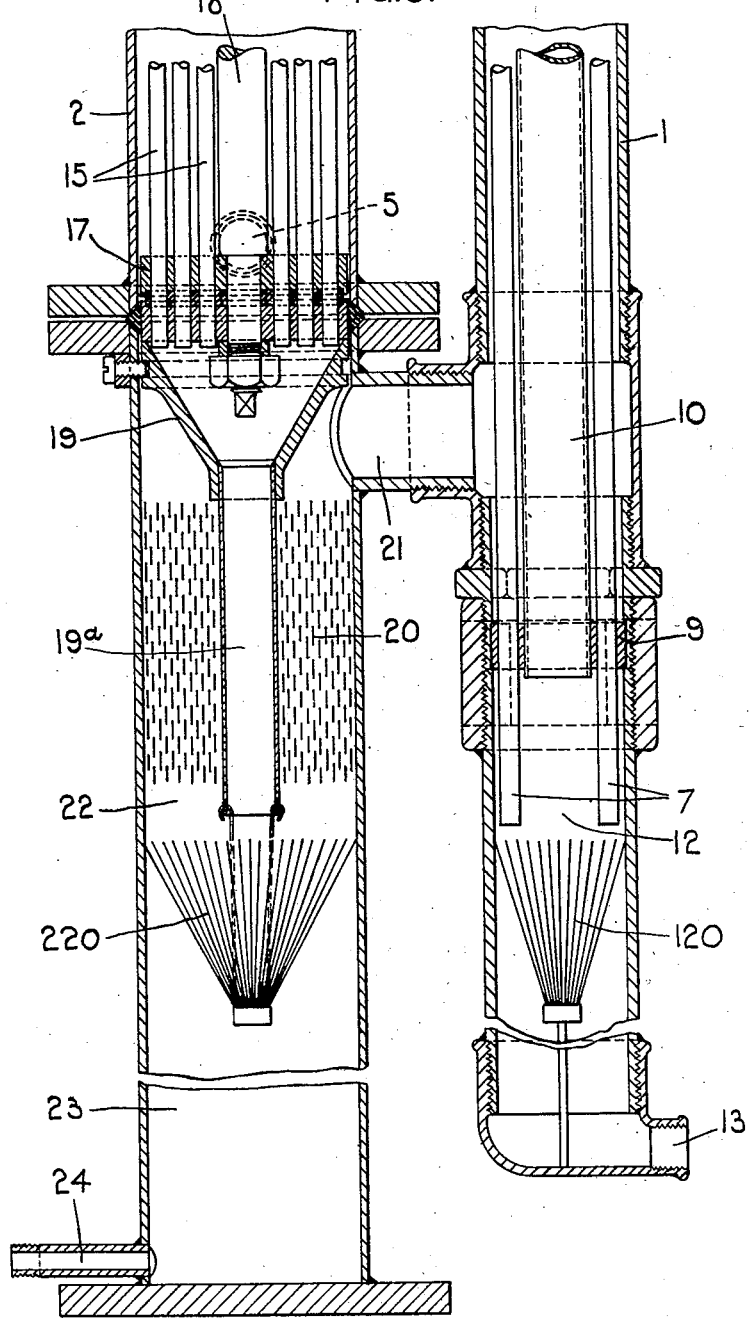

2,209,661

UNITED STATES PATENT OFFICE 2,209,661

COOLING, DRYING, AND REHEATING COMPRESSED AIR

Montague Tabor Pickstone, London, England, assignor to The Superheater Company, New York, N. Y.

Application October 12, 1938, Serial No. 234,541
In Great Britain November 20, 1937

3 Claims. (Cl. 183—32)

This invention relates to the dehydration, purification and conditioning of compressed air as used for various industrial purposes, and more particularly to a new or improved method for increasing the efficiency of the air and improving the quality of the air and to the means by which such improvements are effected.

It is common knowledge that the volumetrical efficiency of compressed air is increased by the application of heat, which also changes its state from more or less complete saturation to a state of relatively low humidity, and that such changes are desirable and in some cases essential for industrial purposes.

It is the object of the present invention to provide a method of and means for treating compressed air, which shall be such that some portion of the heat of compression shall be extracted from this air prior to its entering a cooling system where it will be still further reduced in temperature for the purposes of dehydration, and to use a portion of the heat removed initially, for the purpose of reheating the cold air after leaving the said cooling system.

According to the present invention, the compressed air is cooled in two stages, the first stage being by the transfer of heat from the air leaving the compressor at maximum temperature to the already cooled compressed air, and the second stage by the transfer of heat from the partially cooled compressed air to a cooler fluid, such as water, flowing through the cooling system, the air so cooled being reheated by the interchanging of heat between the incoming compressed air, at high temperature, and such cooled air.

Apparatus for the treatment of compressed air according to the invention comprises, in combination, a heat exchanger apparatus through one of the fluid paths of which the incoming high temperature compressed air flows, a duct connecting the outlet end of such path with the inlet end of one fluid path of a cooling unit through the other fluid path of which a cooling fluid flows, a duct connecting an outlet end of the compressed air path through said unit with the inlet end of the other fluid path of the heat exchanger, and means in said last mentioned duct for changing the direction of flow of the air passing therethrough.

For certain industrial uses such as paint spraying, it is desirable that the compressed air should be free, not only from water, but from oil, grit and other impurities and appropriate intercepting, scrubbing or filtering means are therefore provided in the path of the air to remove such impurities prior to the air entering the reheater which completes the cycle of operations.

In the accompanying drawings—

Fig. 1 is an outside view of an apparatus according to one embodiment of the invention for carrying out the method of treatment of compressed air according to the invention, Fig. 2 is a sectional elevation to a larger scale than Fig. 1 of the upper portion of the apparatus shown in that figure, and Fig. 3 is a sectional elevation to the same scale as Fig. 2 of the lower portion of the apparatus shown in Fig. 1.

The apparatus shown in the drawings comprises a tubular heat exchanger and a cooling unit, 1 being the outer casing of the heat exchanger and 2 the casing of the cooling unit. Compressed air from the air compressor enters the apparatus at the inlet 3 and leaves by the outlet 4, water being admitted to the cooling unit through an inlet 5 and leaving such unit by the outlet 6.

The heat exchanger comprises, in addition to the casing 1, a number of small tubes 7 mounted in upper and lower tube plates 8 and 9 and a central return tube 10, the upper end of which also extends through a partition 11 in the casing 1. At their lower ends the tubes 7 extend some distance below the tube plate 9 and below the lower end of the return tube 10 into a portion of the casing 1 which conveniently may be referred to as the flow direction reversing region and is marked 12 in Fig. 3. The portion of the casing below the region 12 constitutes a chamber for collecting oil thrown down upon the reversal in the direction of flow of the air, and has a drainage outlet 13 for the collected oil.

It will be appreciated that when the direction of flow of compressed air moving downwardly at high speed is suddenly reversed the kinetic energy of particles of oil entrained in the air will cause such particles to separate from the air and continue movement in the downward direction. Whilst at the intended normal speed of flow of the air through the apparatus efficient separation of the oil from the air upon the reversal of flow of the latter is to be expected, it is preferred to provide means for intercepting the oil to ensure that it will not be carried upwardly by the air and conveyed into the cooling unit. Conveniently the intercepting means may be constituted by an impact brush 120 placed in the region 12 of the casing 1, as shown in Fig. 3, with its wires in the path of the air, the oil intercepted by the wires of the brush flowing down the brush into the collecting chamber of the casing below the region 12.

The upper end of the heat exchanger is connected by a bend 14 to the top of the cooling unit. This latter unit comprises, in addition to the casing 2, a relatively large number of small diameter tubes 15 carried at their upper and lower ends in tube plates 16, 17, respectively, the tube plates being held together by a central rod 18 equipped at its opposite ends with suitable nuts. The tubes are mounted in the tube plates and the joints between the tube plates and the casing are made in the manner described in the co-pending application Serial No. 234,542, filed October 12, 1938. It is to be understood, however, that the tubes may be mounted in the tube plates otherwise than as shown and the joints between the tube plates and the casing be effected in any convenient manner, the constructional details of these parts forming per se, no part of the present invention.

Beneath the lower ends of the tubes 2 a cone or funnel 19 is provided having a downward tubular extension 19a, the tube 19a terminating in a region of the casing marked 22 and constituting a flow direction reversing region for the compressed air.

Surrounding the tube 19a and occupying the space between it and the casing 1 is a filter or scrubber 20, and above the filter 20, a duct 21 connects the casing with the casing 1 of the heat exchanger.

Below the flow reversing region 22 of the cooling unit a chamber or sump 23 is provided for collecting moisture condensed in the unit and separated from the compressed air in the flow reversing region, a drainage connection 24 being provided at the bottom of said sump 23.

Whilst it is to be expected that normally on the reversal of the direction of the flow of the air in the region 22 practically the whole of the condensed moisture will be thrown down, and that little will be carried upwardly by the air into the scrubber 20, which is provided to remove any such moisture from the rising air, it is preferred to provide means in the path of the air flowing through the region 22 for intercepting the condensed moisture. Conveniently there is suspended from the tube 19a, or otherwise mounted in the region 22, an impact brush 220, similar to the brush 120 already referred to, the condensed moisture intercepted by the wires of the brush flowing down the brush into the sump 23.

Compressed air from the air compressor enters the apparatus at 3 and flows downwardly through the small tubes 7 into the region 12 of the heat exchanger where its direction of flow is reversed and entrained oil is separated from it and falls or flows down the wire brush 120, into the bottom of the casing, the air flowing upwardly through the return tube 10 and via the bend 14 into the top of the cooling unit, whence it passes down through the small tubes 15, the cone or funnel 19 and tube 19a into the flow reversing region 22. After changing its direction and depositing condensed moisture, the compressed air passes upwardly through the filter or scrubber 20 and through the duct 21 into the casing 1, flowing upwardly therethrough, and leaving the casing by way of the outlet 4. Water or other cooling fluid enters the cooling unit 15 and flows upwardly through the casing 2 in contact with the outer surfaces of the tubes 15, the water leaving the unit at the outlet 6. It will be seen that in the cycle of operations the high temperature compressed air entering the apparatus is initially cooled by passing through the tubes 7 in a direction contra to the direction of flow of the cooled air received from the cooling unit which is flowing upwardly through the casing 1 and after being initially cooled the air is further cooled by the transfer of heat to the water surrounding the tubes 15 through which the air flows in a direction contra to that of the flow of the water through the casing 2. It will be appreciated that the cooled air flowing through the heat exchanger in contact with the tubes 7 and 10 will be reheated to a material extent by the heat abstracted from the incoming compressed air, a recuperative effect thus being obtained.

The apparatus shown in the drawings is of simple construction and is easily fabricated and although it is at present considered preferable to form the recuperative heat exchanger and the cooling unit as separate but inter-connected units, the whole apparatus may be formed as a single unit, in which case the recuperative heat exchanger may surround the cooling unit, or vice versa. Further, if desired, the apparatus may be associated with a compressed air receiver and, if desired, be placed within such receiver. Whatever be the constructional details of the apparatus, the functioning of the parts is such that no additional heat is provided from any outside source throughout the cycle of operations.

The filter or scrubber 20 is provided to remove from the air any moisture, oil, grit or other impurities which may not have been intercepted or thrown down when the air changed its direction of flow in the region 22 of the cooling unit so that the air leaving the unit may be thoroughly purified and suitable for paint spraying or other industrial uses needing such purified, compressed air. The filtering or scrubbing medium 20 employed preferably consists of a loosely rolled length of expanded metal such, for example, as brass, but other filtering medium may be employed, as, for instance, lead-brass or other metallic wool.

An advantage arising from the employment of the water-cooled air to initially cool the hot air delivered by the compressor, and to be itself reheated in so doing, is that the quantity of water used in the water-cooled portion of the apparatus is materially less than would be needed if the desired reduction of temperature were to be effected solely by water-cooling.

A further advantage arises from the initial cooling of the air in that the oil entrained in the air can be removed before the air enters the water-cooled portion of the apparatus, thus reducing the liability of the tubes of the final cooling unit being fouled by such oil, it being understood that at the temperature of the air in the region 12 of the primary cooling apparatus the moisture in the air is still in vapour form.

What I claim is:

1. In apparatus for the treatment of compressed air, a cooling unit comprising a vertical casing housing a group of small diameter tubes extending between tube plates, the air to be cooled entering the top of said casing and said air and water for cooling flowing through the tubes and casing, respectively, in opposite directions, a downwardly extending tube in said casing below said small tubes and receiving air after its passage through said tubes, said tube extending to an airflow direction reversing region of the casing, an outlet for cooled air leading from the casing at a level above the lower end of said tube, a drainage compartment at the bottom of said casing receiving the condensed moisture separated from the air in said reversing region; a heat exchanger through one of the fluid paths of which the incoming high temperature compressed air flows, a duct connecting the outlet end of such path with the inlet at the top of said cooling unit and another duct connecting said outlet end of the compressed air path of said cooling unit with the inlet end of the other fluid path of said heat exchanger.

2. A heat exchanger for the treatment of compressed air comprising a hollow casing provided with a closure at one end and an outlet at its opposite end; an air inlet in the wall of said casing at a point spaced from said outlet; a partition intermediate said inlet and outlet and sealing them from each other; spaced tube sheets located in said casing at points between said inlet end and closure, the tube sheet adjacent said inlet being spaced from said partition and together therewith defining an inlet chamber and the other tube sheet being spaced from said closure and cooperating therewith to define a separating chamber; a plurality of tubes connected into said tube sheets and placing said inlet chamber in communication with said separating chamber; tubular means extending through said tube sheets and partition to place such separating chamber in communication with said outlet so arranged that the direction of air flowing from said tubes is reversed in passing through said separating chamber to said tubular means; means located in said separating chamber for intercepting and collecting moisture or oil disentrained from air by said flow reversal in passing through said separating chamber; and other inlet and outlet connections disposed between said tube sheets and so arranged that fluid may be circulated through said casing about said tubes and discharged from said casing.

3. A heat exchanger for the treatment of compressed air comprising; a vertically disposed casing provided with a closure at its bottom end and outlet at its upper end; an air inlet in the wall of said casing below said outlet; a partition above said inlet and sealing it from said outlet; upper and lower tube sheets located in said casing between said inlet and closure, the upper tube sheet being spaced from said partition and together therewith defining an inlet chamber, and the lower tube sheet being spaced from said bottom closure and cooperating therewith to define a separating chamber; a plurality of tubes connected into said tube sheets and placing said inlet chamber in communication with said separating chamber; tubular means extending through both said tube sheets and said partition to place said separating chamber in communication with said outlet and so arranged that the direction of air flowing downwardly from said inlet chamber through said tubes is reversed in passing through said separating chamber to flow upwardly through said tubular means; means so located in said separating chamber in the air flow direction reversing region thereof as to intercept moisture or oil disentrained from the air by the reversal thereof in passing from said tubes through said separating chamber to said tubular means; and other inlet and outlet connections in the wall of said casing between said tube sheets so arranged that a fluid may be circulated through said casing about said tubes and discharged from said casing.

MONTAGUE TABOR PICKSTONE.